US012663213B2

(12) United States Patent
Carlesso et al.

(10) Patent No.: US 12,663,213 B2
(45) Date of Patent: Jun. 23, 2026

(54) COOLING APPARATUS

(71) Applicants: TRUYOINS S.R.L., Treviso (IT); MATERIAL HANDLING TECHNOLOGY S.R.L., Venezia Mestre (IT)

(72) Inventors: Franco Carlesso, Treviso (IT); Edoardo Pizzato, Treviso (IT)

(73) Assignees: TRUYOINS S.R.L., Treviso (IT); MATERIAL HANDLING TECHNOLOGY S.R.L., Venice (IT)

( * ) Notice: Subject to any disclaimer, the term of this patent is extended or adjusted under 35 U.S.C. 154(b) by 411 days.

(21) Appl. No.: 18/560,952

(22) PCT Filed: May 17, 2022

(86) PCT No.: PCT/IB2022/054562

§ 371 (c)(1),
(2) Date: Nov. 15, 2023

(87) PCT Pub. No.: WO2022/243856

PCT Pub. Date: Nov. 24, 2022

(65) Prior Publication Data

US 2024/0263879 A1 Aug. 8, 2024

(30) Foreign Application Priority Data

May 18, 2021 (IT) ........................ 102021000012812

(51) Int. Cl.
*F27B 7/38* (2006.01)
*C21B 3/08* (2006.01)
(Continued)

(52) U.S. Cl.
CPC ................ *F27B 7/383* (2013.01); *C21B 3/08* (2013.01); *F27D 1/12* (2013.01); *F27D 9/00* (2013.01);
(Continued)

(58) Field of Classification Search
CPC .. F27B 7/383; F27B 7/386; F27D 1/12; F27D 9/00; C21B 3/02; C21B 2400/022;
(Continued)

(56) References Cited

U.S. PATENT DOCUMENTS

| | | | | |
|---|---|---|---|---|
| 8,088,194 | B2 * | 1/2012 | Tsutsumi ................ | C22B 1/248 266/190 |
| 2024/0263879 | A1 * | 8/2024 | Carlesso ............... | F27D 15/028 |

FOREIGN PATENT DOCUMENTS

| | | | | |
|---|---|---|---|---|
| EP | 2228458 | A1 | 9/2010 | |
| EP | 2261383 | A1 * | 12/2010 | ............. C22B 7/005 |

(Continued)

*Primary Examiner* — Gregory A Wilson
(74) *Attorney, Agent, or Firm* — Carmel Patent Agency; Robert Ballarini

(57) ABSTRACT

An apparatus for cooling a material includes: at least one reactor, substantially tubular, which is rotatable and which includes a rotating tubular structure defining inside it a chamber for receiving and passing through the material to be cooled; and means for indirectly cooling the material passing through said chamber by means of a cooling fluid, the means for indirect cooling comprise at least one dispensing device for the cooling fluid. The at least one dispensing device includes at least two dispensing mouths defined by respective slots, with substantially longitudinal development, for the escape of the refrigerant fluid, the device being arranged with respect to the tubular structure in so that the flow outgoing from said two slits affects and laps two respective areas, distinct from each other, of the external surface of the tubular structure.

15 Claims, 8 Drawing Sheets

(51) Int. Cl.
*F27D 1/12* (2006.01)
*F27D 9/00* (2006.01)

(52) U.S. Cl.
CPC .. *C21B 2400/022* (2018.08); *C21B 2400/052* (2018.08); *C21B 2400/066* (2018.08); *F27D 2009/0081* (2013.01)

(58) Field of Classification Search
CPC ........ C21B 2400/058; C21B 2400/052; C21B 2400/024
See application file for complete search history.

(56) References Cited

FOREIGN PATENT DOCUMENTS

| | | | | | |
|---|---|---|---|---|---|
| EP | 2889569 | A1 | | 7/2015 | |
| KR | 101412106 | B1 | | 6/2014 | |
| WO | WO-2016116884 | A1 | * | 7/2016 | ............... C21B 3/10 |
| WO | WO-2021198977 | A1 | * | 10/2021 | ................ F28F 5/02 |

* cited by examiner

COOLING APPARATUS

FIELD OF THE TECHNIQUE

The present invention relates to an improved cooling apparatus, in particular for cooling white or black slag. In particular, the cooling apparatus is of the rotating tubular/cylindrical reactor type, to be used preferably in a plant and/or method for the recovery of the white or black slag that is generated in the steel production and refining phase.

BACKGROUND OF THE INVENTION

It is known that the main waste generated in the production/refining of steel substantially includes smoke abatement powders, exhausted refractory materials and slag in general. During the refining process of steel it is known to add a composition (rich in lime) which can be partially recovered/disposed of at the end of the refining process (known as "white slag").

To date, the main problem remains that relating to the recovery and/or disposal of the white slag deriving from the steel refining processes.

The white slag is very rich in lime and lends itself to its recovery, although its tendency to hydration and withering processes make it a highly unstable material.

This involves considerable problems in the management of an outdoor storage of the material and in the prevention of its dispersion into the environment.

The recovery of the white slag would allow to achieve two important advantages:

- reduce the use of raw materials such as basic slagging agents and any other elements such as silicates, aluminates and magnesium-based;
- reduce landfill disposal, to the benefit of the ecological/environmental aspect.

This is of fundamental importance if we consider that white slag constitutes a waste by-product potentially recoverable in a steel plant.

The recovery of the white slag generally takes place by cooling the slag from a temperature close to that of the molten steel (about 1500° C.) in which the slag is in liquid form, at a temperature suitable for its recovery in the form of powders/fragments. In particular, during the cooling process of the white slag, the dicalcium silicate undergoes phase transitions at temperatures below about 675° C. which lead to an increase in volume which, due to the different crystalline structure and density, gives rise to a fragmentation of the matrix, the so-called "withering".

The "controlled" reduction of the temperature of the white slag in a "protected" environment therefore allows its recovery, generating a product rich in lime that can find a new use in the furnace or in other different applications.

It is known that cooling white slag by direct contact with water is highly inadvisable as calcium oxide (which is the main content of lime) tends to form a hydroxide, thus inhibiting the original efficacy of lime oxide and thus preventing its reuse.

A first method is known for the recovery of the white slag which is based on the previously described withering process, applying a "static" type of cooling of the material.

The white slag is left to cool resting on grids, inside suitable chambers, until it is pulverized.

The grids allow the passage of the powder obtained in the underlying hoppers, where it is hit by an air flow that favors the cooling of the material.

This method presents a series of problems and drawbacks, such as a poor heat exchange efficiency, consequently long times to achieve the pulverization of the material, and a further slowdown of the transformation kinetics due to the accumulation of dust on the upper part of the material which act as an insulating layer.

JP5213493 and JP5217388 describe a second method for the recovery of the white slag which is also based on the withering process, in which there is an open tubular reactor in which the white slag is inserted. In this case, the cooling of the white slag is obtained indirectly by cooling the external surface of the reactor by means of water which is sprayed on the upper part of the reactor itself and then collected in a suitable tank, located below the reactor.

The main problems encountered in indirect cooling by spraying water on the external surface of the rotating drum (reactor) are represented by the dispersion and the high water consumption, the poor heat exchange concentrated only in the upper part of the reactor resulting in large dimensions of the reactor, as well as from the possibility of wetting the material with deterioration of its quality.

EP2261383 describes a third method for the recovery of the white slag in which an open tubular drum (or reactor) is used in which the white slag is inserted for its withering. In this solution, the white slag cooling system mainly provides a flow of air which affects the internal region of the rotating cylinder and which cools the white slag contained therein by direct heat exchange. Due to the humidity present in the cooling air flow, the free lime and any free magnesia present in the white slag are hydrated, slowing down the withering process and generating a qualitatively worse product, due to the greater energy required for their subsequent dissociation in the oven. The use of high volumes of air for direct cooling of the white slag must necessarily include the use of a large downstream filtering system, with plant engineering and economic burden. Furthermore, in the solution of EP2261383, the cooling system can include, in addition to the flow of air that affects the internal region of the rotating drum, also a series of nozzles positioned under the rotating drum capable of spraying water against the external surface of a portion of the same drum, and a tank for collecting the sprayed water.

Furthermore, according to embodiments not described and not illustrated in EP2261383, the cooling system can also be an integral part of the rotating drum and can consist of a series of cooling plates fixed inside the rotating drum; in particular, inside the plates there are ducts for the circulation of a refrigerant fluid which can then be sent to exchangers to dissipate the heat exchanged. The realization of refrigerating plates fixed inside the rotating drum and the realization of a complex system of ducts for the circulation of the refrigerant fluid, in addition to providing a reduced exchange surface, involves an evident plant engineering and economic burden, which is added to the plant engineering of the air flow that affects the internal region of the rotating drum.

The process of EP2261383 is of the "batch" type in which the tubular reactor is cyclically loaded with the white slag and cyclically discharged from the residual metal crusts that could damage the reactor during its rotation. Consequently, during the loading phase, the tubular reactor could receive both white slag at too high temperatures and blocks of large dimensions that could damage the reactor and its structures. Similarly, any metal crusts not pulverized in the withering process remain in permanent rotation inside the rotating drum and are removed manually only at the end of a predetermined number of cycles; this causes the compacting of the dust (which is therefore not recovered) and the consequent creation of material "crusts", severely limiting the transformation and recovery yields.

WO2016/116884 describes an indirect cooling and recovery system for the white slag in which a rotating drum is intended for the indirect cooling of the white slag thanks to a cooling fluid circulating in a cavity formed in the shell of the drum. Disadvantageously, in the aforementioned rotary drum systems, the internal walls of the drum are continually subjected to stress and wear by the white slag in the cooling phase and can suffer from performance degradation or prolonged downtime if the drum needs to be replaced.

KR101412106 describes an iron scrap recovery system which provides for the use of a rotating drum and a cavity which is arranged around the rotating drum and which is crossed by the cooling fluid, thus causing indirect cooling of the material introduced to the inside the rotating drum EP2228458 describes an indirect cooling and recovery system for the white slag in which a rotating drum is intended for indirect cooling of the white slag by means of a cooling fluid that circulates in a chamber defined around the external surface of the drum.

EP2889569 describes an indirect cooling system for the material discharged from a rotary kiln, in which a rotating drum is provided with a cooling circuit in which the cooling fluid permeates both a duct that crosses the drum centrally and a cavity that wraps the drum externally rotating.

OBJECTS OF THE INVENTION

The object of the invention is to propose a cooling apparatus, in particular for cooling bulk materials, preferably white or black slag, which at least partially overcomes the aforementioned drawbacks present in traditional solutions.

Another object of the invention is to propose an apparatus which allows to obtain a high energy efficiency, while maintaining at the same time high quality standards of the material obtained and safety for the operators and for the equipment.

Another object of the invention is to propose an apparatus which allows to obtain a high cooling efficiency of the white or black slag.

Another object of the present invention is to propose a cooling apparatus which allows to save electrical and thermal energy and also to reduce the quantity of water or refrigerant fluid used.

Another object of the invention is to propose an improved cooling apparatus which allows to obtain a high energy efficiency.

Another object of the invention is to propose a cooling apparatus which is constructively completely reliable.

Another object of the invention is to propose an improved cooling apparatus which is resistant and robust.

Another object of the invention is to propose a cooling apparatus which allows the white or black slag to be cooled in an optimal manner, or which obtains an optimal cooling of the white or black slag while at the same time obtaining the aforementioned high energy efficiency.

Another purpose of the invention is to propose an apparatus capable of treating the white slag in the various and possible physical conditions in which it can occur, for example in the solid, semisolid-pasty or liquid state, depending on the needs and requirements.

Another purpose of the invention is to propose an apparatus which is quick and easy to maintain and which, at the same time, allows to improve the energy efficiency in the recovery of white or black slag, while maintaining high quality standards of the material obtained.

Another object of the present invention is to obviate the problems of known techniques by proposing an apparatus for cooling the white or black slag that is generated in the steel production phase, capable of reducing production times and costs, while maintaining the at the same time high quality standards of the material obtained and safety for operators and equipment.

Another object of the invention is to propose an apparatus capable of maximizing the heat exchange during the cooling phase of the white or black slag, allowing the reduction of the dimensions of the same apparatus and optimizing the transformation and recovery yields of the slag.

Another object of the invention is to propose an apparatus capable of limiting and optimizing the quantity of the necessary cooling fluid, avoiding its dispersion and therefore any pollution of the white or black slag.

Another purpose of the invention is to propose an apparatus which is quick and easy to maintain and which, at the same time, allows to improve the recovery efficiency of the slag, reducing the recovery cycle times and at the same time maintaining high quality standards of the material obtained.

Another object of the invention is to propose an apparatus which is an improvement and/or alternative with respect to traditional solutions.

Another object of the invention is to propose an apparatus which is simple, convenient and quick to install and/or maintain.

Another object of the invention is to propose an apparatus with an alternative characterization, both in constructive and functional terms, with respect to traditional solutions.

Another object of the invention is to propose an apparatus which can be manufactured simply, quickly and with low costs.

Another object of the invention is to propose a device which has a particularly reduced bulk inside the system in which it is installed.

Another object of the invention is to propose an apparatus, as well as a plant, whose construction, installation and maintenance are particularly simple, rapid and economical.

SUMMARY OF THE INVENTION

All these objects—considered both individually and in any combination thereof—are achieved, according to the invention, with a cooling apparatus, in particular for cooling the white or black slag, with the characteristics indicated in claim 1

DESCRIPTION OF THE FIGURES

Further characteristics and advantages of the invention will become clearer from the description of some preferred but not exclusive embodiments of the apparatus according to the invention, illustrated, purely by way of example and by way of non-limiting example, in the attached drawings in which.

DETAILED DESCRIPTION OF THE INVENTION AND OF SOME OF ITS PREFERRED EMBODIMENTS

Figure 1:
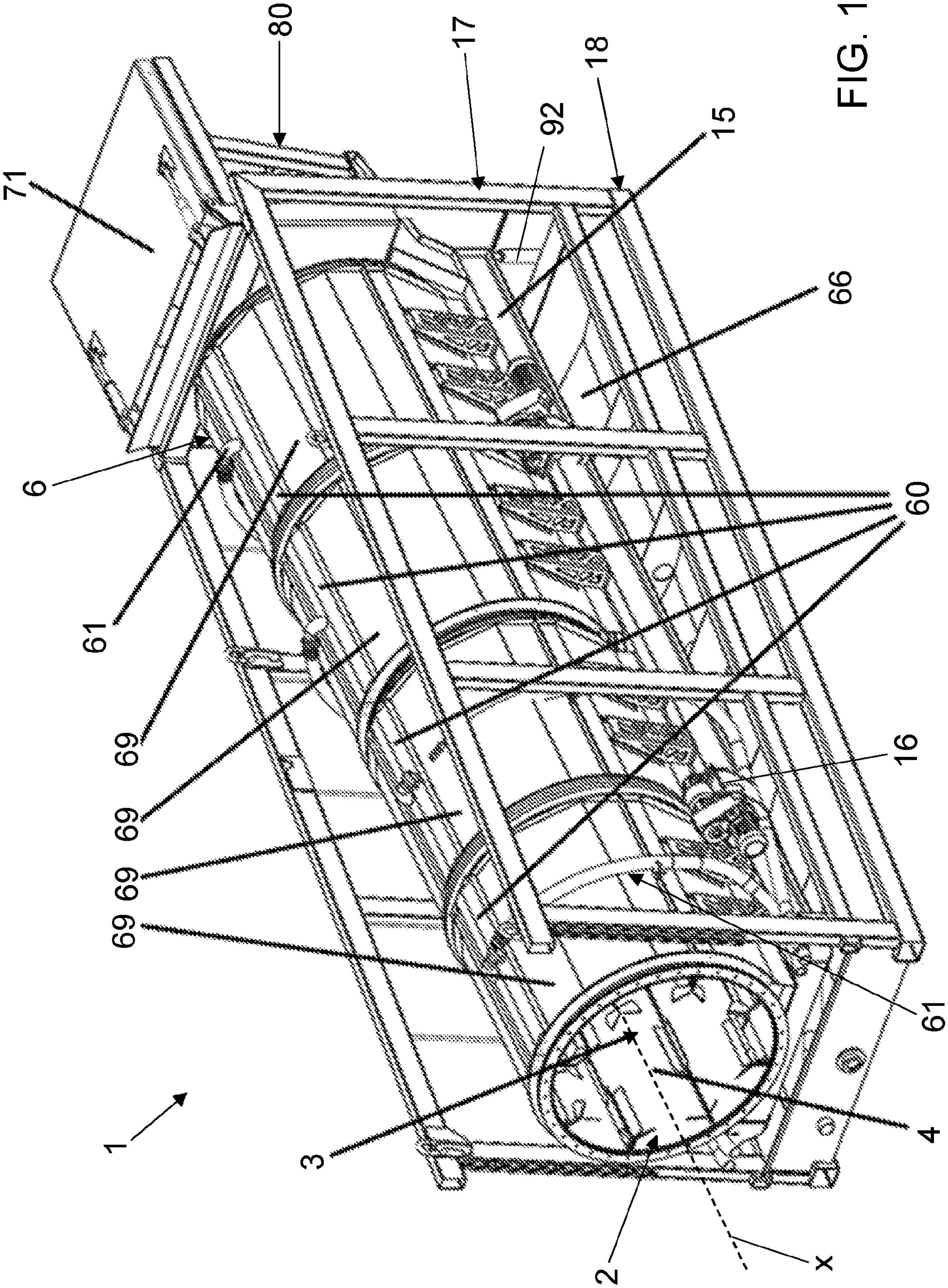
FIG. 1 shows a perspective view of the cooling apparatus according to the invention.
Figure 2:
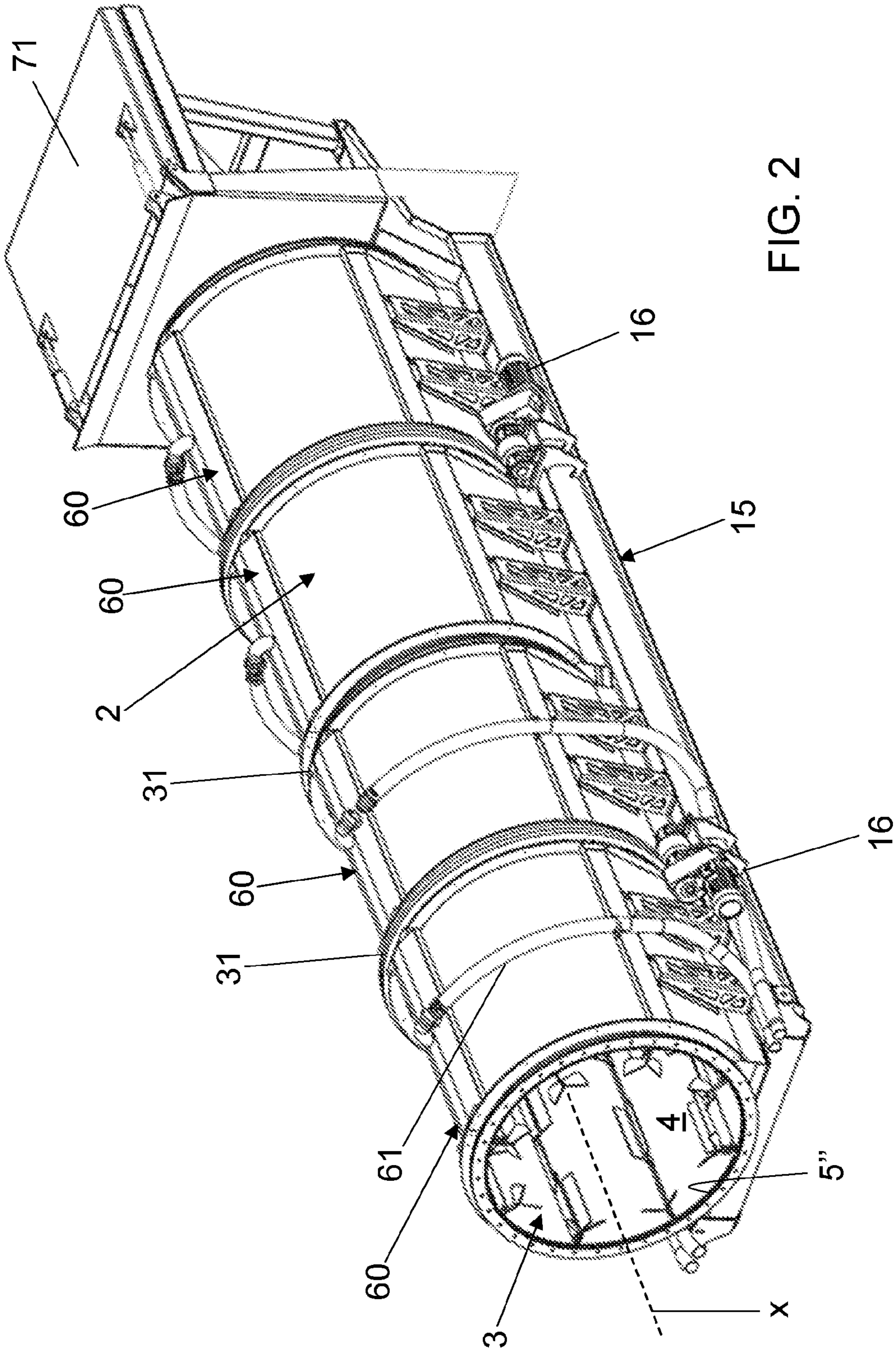
FIG. 2 shows it in a perspective view without the fixed base frame and the casing of the tubular reactor.
Figure 4:
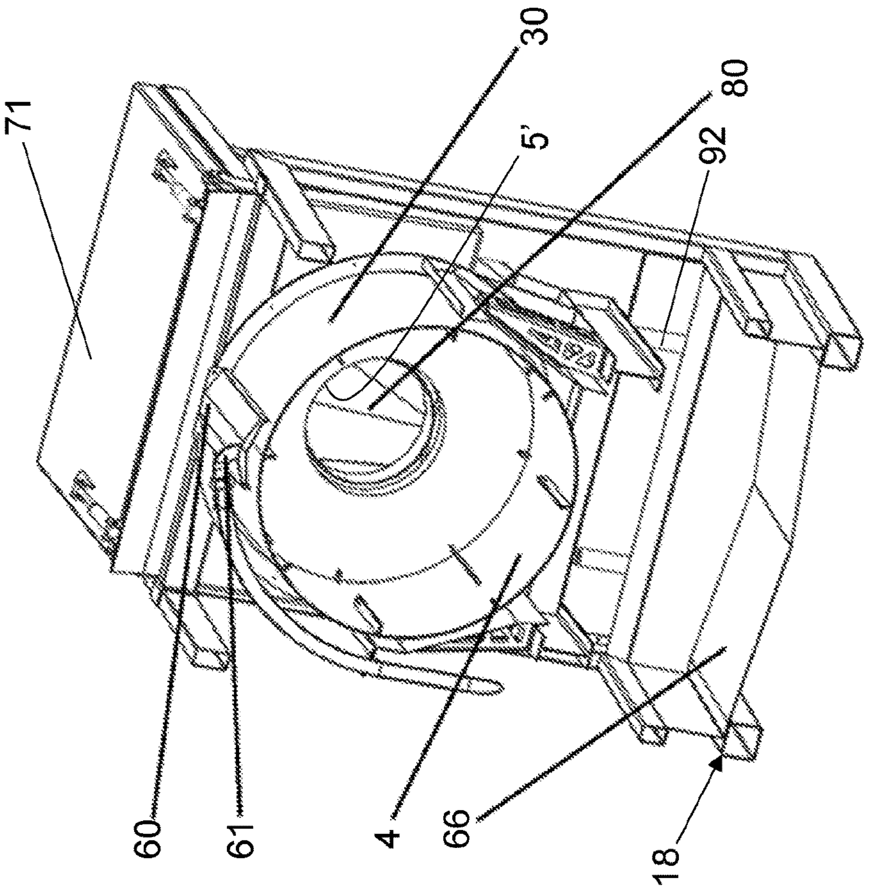
FIG. 4 shows the section of FIG. 3 from a different perspective and without the casing of the tubular reactor.
Figure 3:
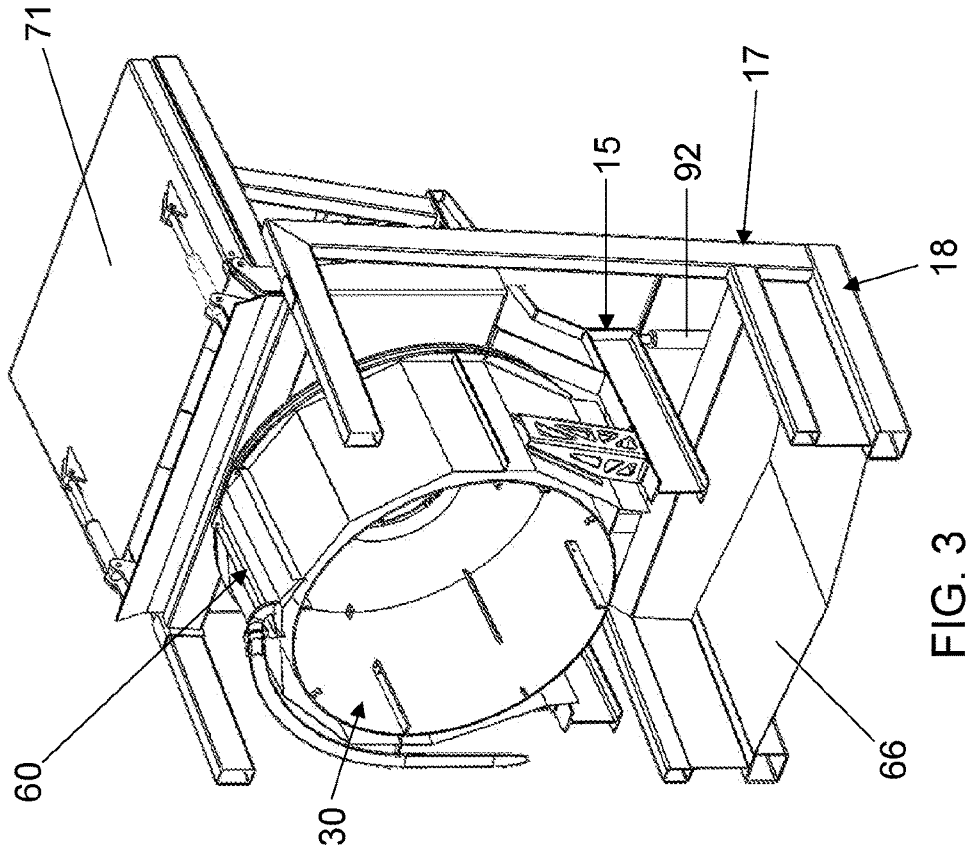
FIG. 3 shows a vertical section of it in perspective view.
Figure 5:
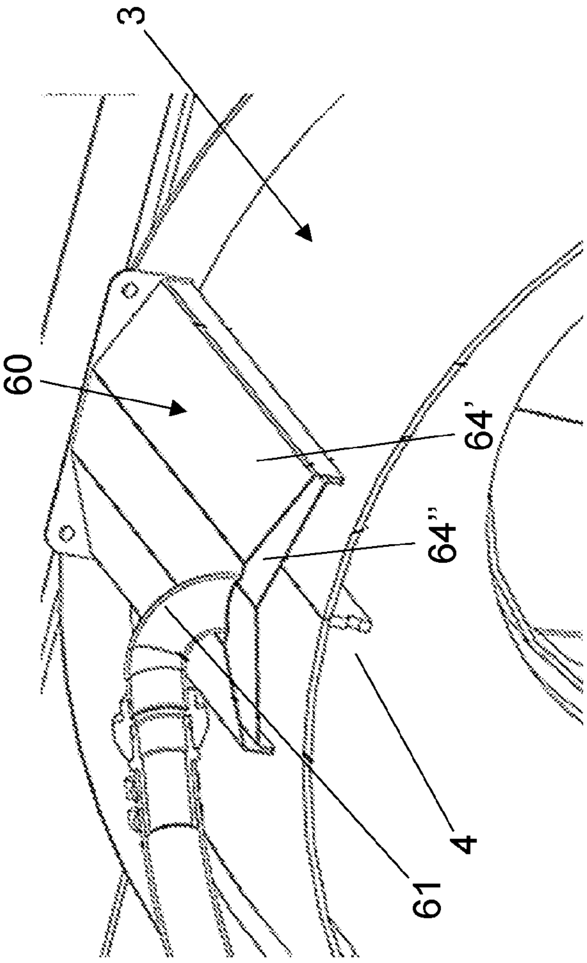
FIG. 5 shows a perspective view of a detail of the cooling means.
Figure 6:
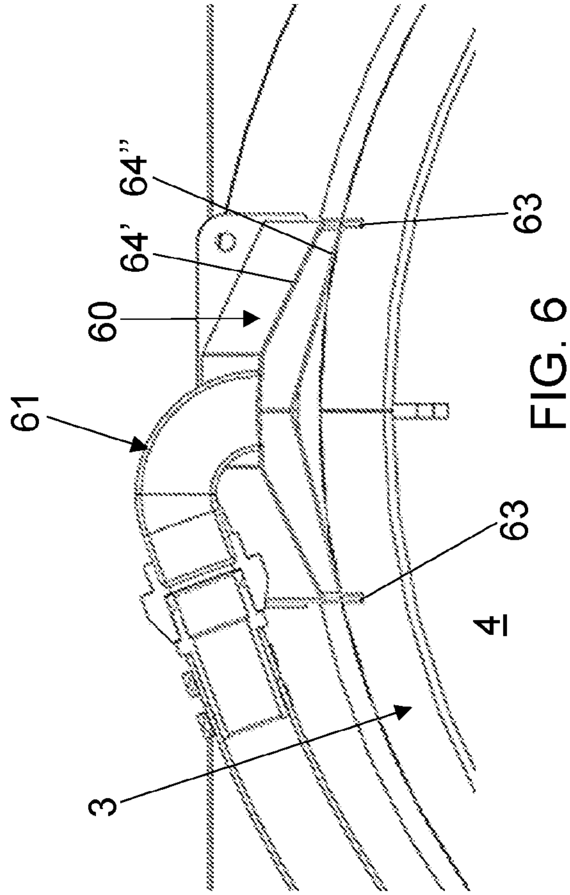
FIG. 6 shows the detail of FIG. 5 in a different perspective view.

The present invention relates to an improved cooling apparatus 1, for cooling a material, in particular for cooling white or black slag.

The term "white slag" hereinafter refers to a waste deriving from the steel refining processes, during the production chain of the steel itself. In particular, white slag is a waste material very rich in lime and therefore advantageously recoverable. The term "black slag" here means the slag that forms, above the steel melting bath, as a result of the oxidation of the scrap and of the compounds generated by the additives inserted in the charge of the electric furnace to produce steel starting from the scrap. In particular, black slag is a waste material that contains various components and, in particular, contains lime (CaO) or lime-based compounds. Conveniently, the black slag is about 70-95%, preferably about 80-90%, formed by the following components: CaO (lime), SiO2 and Al2O3 and MgO; suitably, the quantities of the individual components vary according to the composition of the black slag.

Advantageously, the apparatus 1 according to the present invention can be operatively associated with a steel production plant and/or its derivatives or variants.

The apparatus 1 will be described below with particular reference to the treatment of steel slag, however it is understood that—in a corresponding way—materials, waste or even non-waste, derived from other metal alloys or metals (for example copper and aluminum).

Preferably, the cooling apparatus 1 is suitable for use in a plant for the recovery of the white slag that is generated in the steel production and refining phase and/or is suitable for use in a plant for the recovery of slag, black that is generated inside the electric furnace during the steel production phase.

Advantageously, the apparatus 1 is suitable for treating materials that are generated in the production phase of steel or other metal alloys and, preferably, materials that are formed/found on/at the bottom of a ladle furnace and which comprises the so-called "white slag", containing lime or lime-based compounds. Preferably, the material found on the bottom of the ladle furnace comprises white slag and a molten or semi-molten/viscous (i.e. liquid or fluid) metal alloy. In particular, the metal alloy can preferably be steel but it could be other metal alloys, for example aluminum or copper.

The cooling apparatus 1 according to the invention comprises at least one rotating reactor (or drum) 2 having a substantially tubular development (preferably cylindrical).

The rotating reactor 2 comprises at least one tubular structure 3 with a wall which internally delimits a chamber 4 for receiving and passing through the material to be cooled. The tubular structure 3 extends between an inlet opening 5' for the material to be cooled and an outlet opening 5" for the cooled material.

Preferably, the tubular structure 3 has a circular cross-section, but it could also be polygonal.

Conveniently, in order to cool the material in an optimal manner, the reactor 2 is rotatably mounted on a support frame 15 and can be operated in rotation around the main axis X by motorization means 16. Conveniently, the main axis X corresponds to longitudinal axis of development of the reactor 2.

Advantageously, the support frame 15 is mobile, in particular it is pivoting, with respect to a fixed structure 17 which is intended to be placed on the ground and which comprises at least a lower support base 18 (cf. FIG. 1) and is preferably made of metallic material. The lower support base 18 of the fixed structure 17 is preferably arranged parallel to the support surface on which the entire apparatus 1 rests. Advantageously, as described in more detail below, on the lower support base 18 of the fixed support structure 17 can be at least one tank 66 for collecting the refrigerant fluid must be mounted.

Preferably, the support frame 15 with the reactor 2 can be moved between a condition in which the main axis X of the reactor is substantially horizontal to at least one condition in which the axis X is partially inclined with respect to the horizontal, in particular by a greater height in correspondence with the inlet opening 5' to a lower level in correspondence with the outlet opening 5". Conveniently, motorization means 92 (for example hydraulic or electromechanical jacks) can be provided to vary the inclination of the support frame 15 with the reactor 2 with respect to the horizontal.

Conveniently, a conveyor 80 can be provided at the inlet opening 5' of the reactor 2 to send the material to be treated inside the reactor. Advantageously, a movable lid 71 can be provided at the inlet mouth of the conveyor 80, to open and close the inlet of the conveyor itself in this way selectively.

Figure 10:
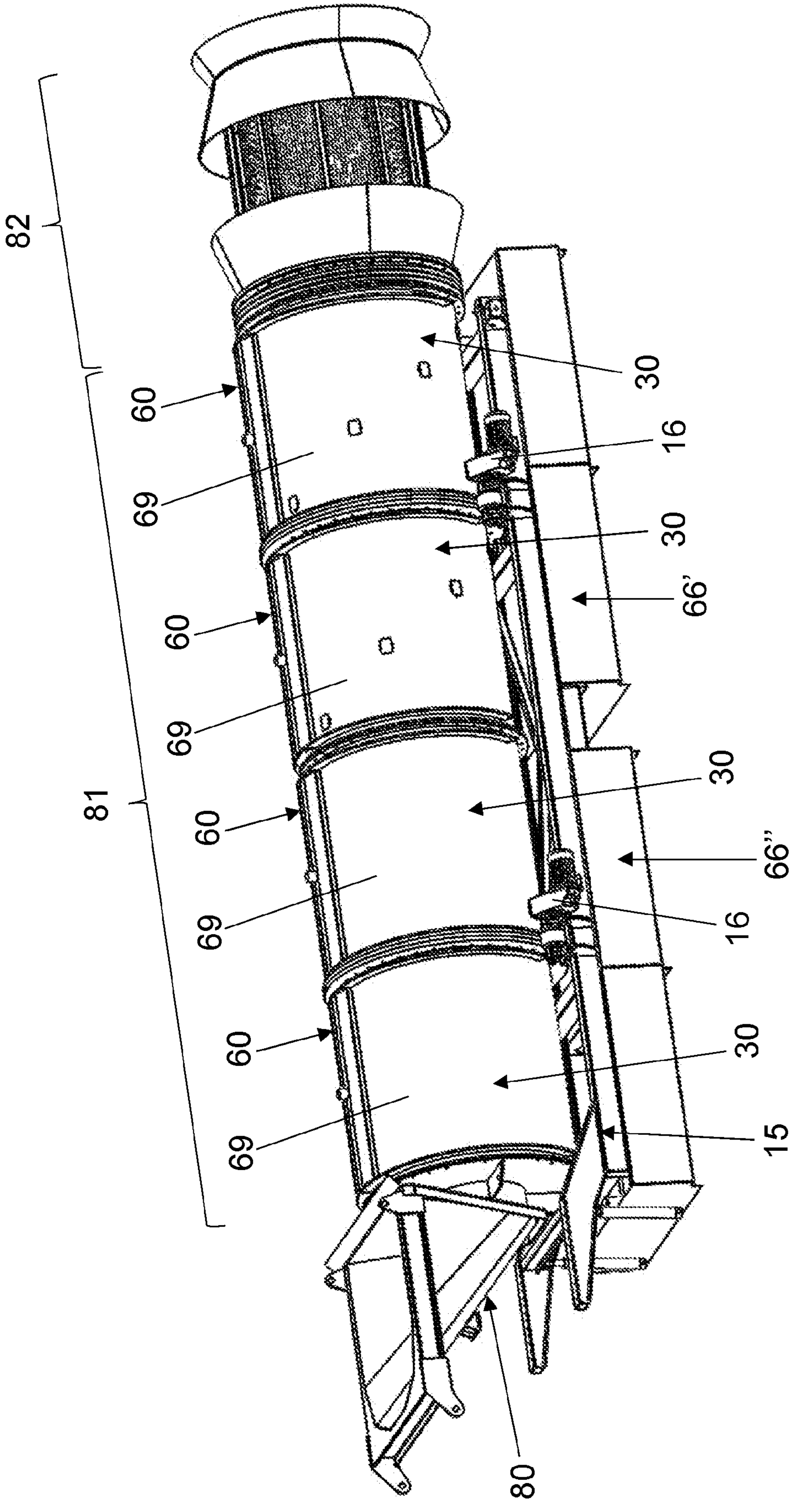
FIG. 10 shows the cooling apparatus according to the invention with the screening segment.
Figure 11:
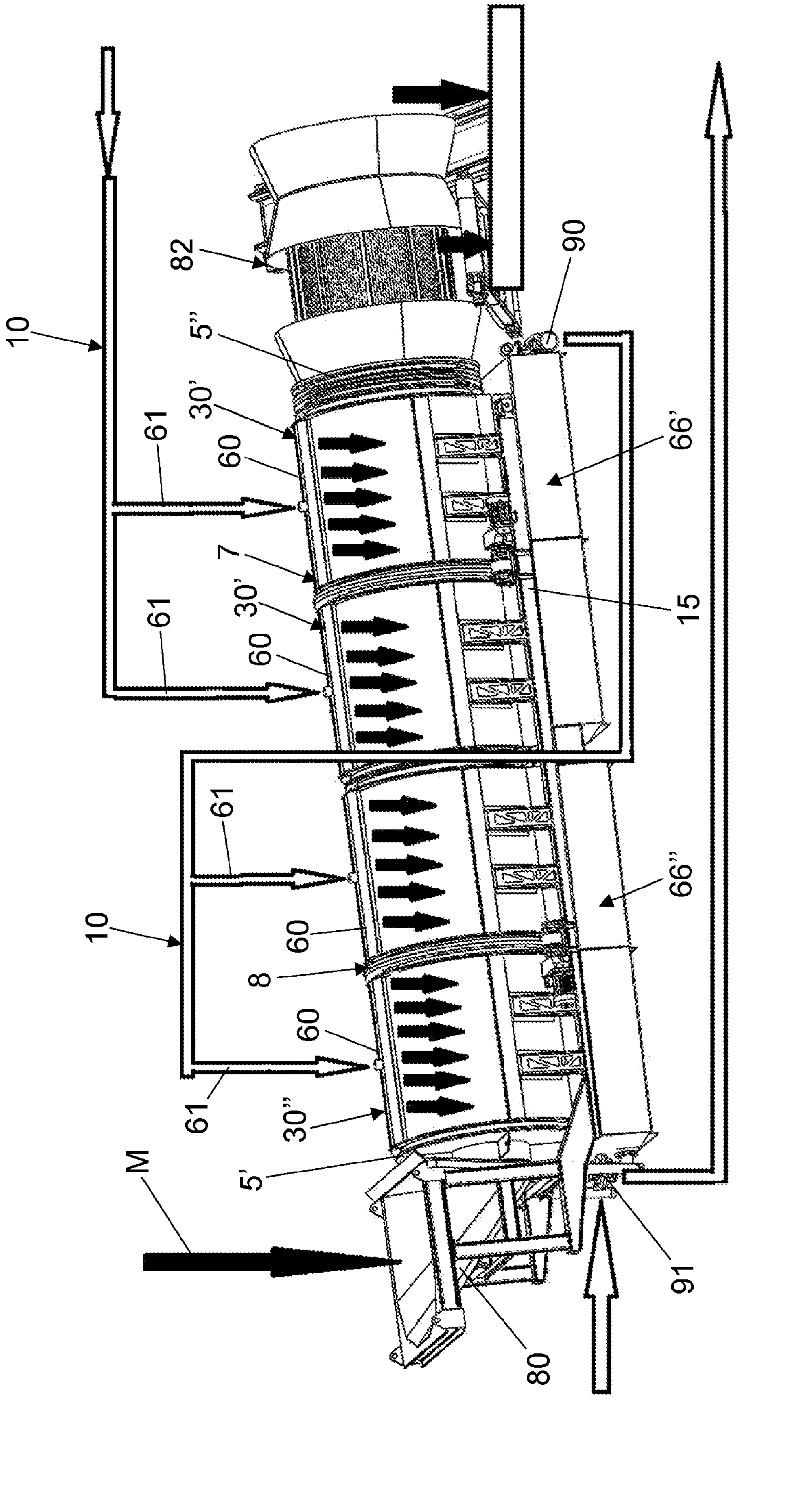
FIG. 11 shows the apparatus of FIG. 10 without the casing and with schematically indicated the path of the cooling fluid.
Figure 12:
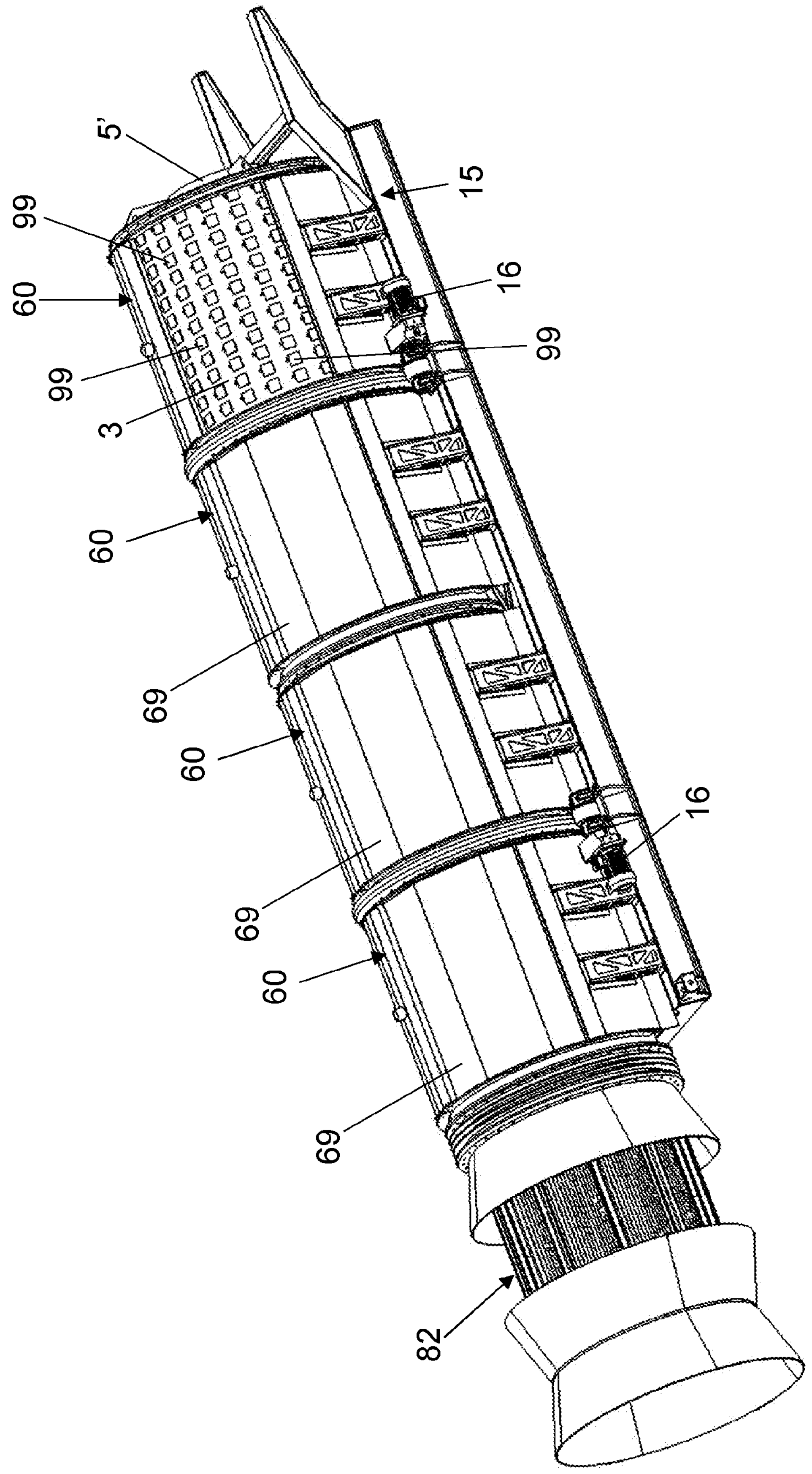
FIG. 12 shows a variant embodiment of the cooling apparatus according to the invention in which a panel of the casing has been removed from a module of the tubular reactor.

Conveniently, as shown in FIGS. 10-12, the apparatus 1 can comprise a cooling segment 81 suitable for cooling the material, and a screening segment 82, placed in cascade to the cooling segment. In the screening segment 82, the selection and separation of fragments and powders of the material, in particular of the white or black slag, having a size smaller than a predetermined size is carried out. Conveniently, the screening segment 82 can comprise a screen, preferably rotating with the tubular reactor 2. Conveniently, the screen can be of the type described in Italian patent applications 102020000028850 and/or 102020000028844.

Conveniently, the apparatus 1 comprises cooling means—indicated as a whole with the number 6—of the tubular structure 3 which delimits the chamber 4 inside. The cooling means 6 of the apparatus 1 indirectly cool, by means of a cooling fluid, the material that passes through the chamber 4, i.e. without direct contact between the refrigerant fluid and the material to be cooled.

Figure 8:
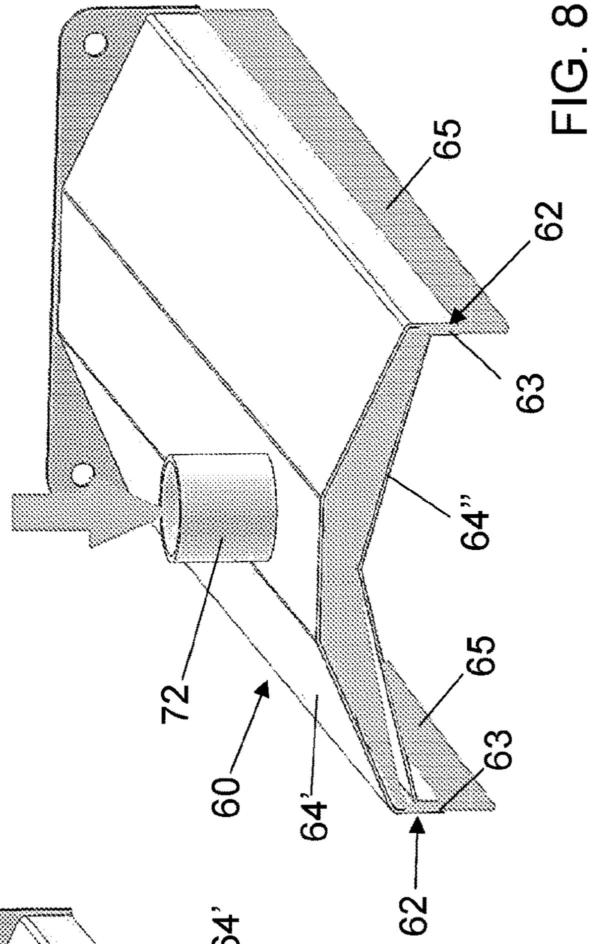
FIG. 8 shows the device of FIG. 7 with the refrigerant fluid.
Figure 7:
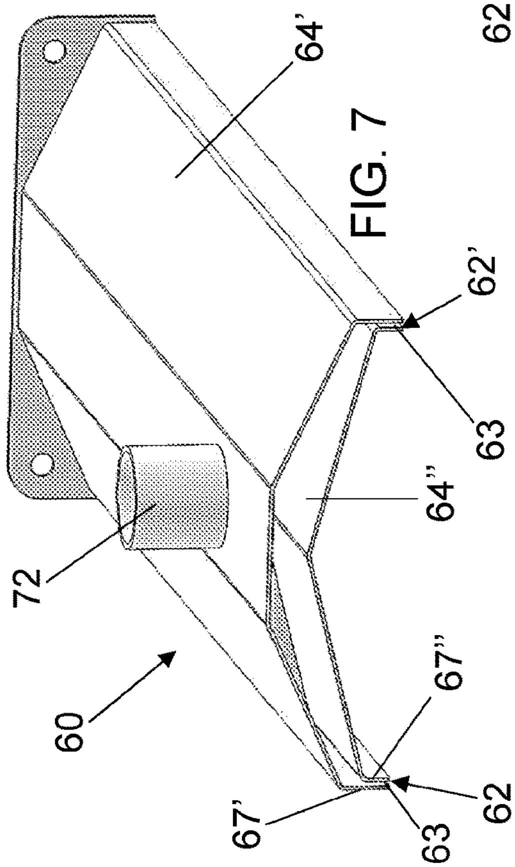
FIG. 7 shows the dispensing device in perspective view.
Figure 9:
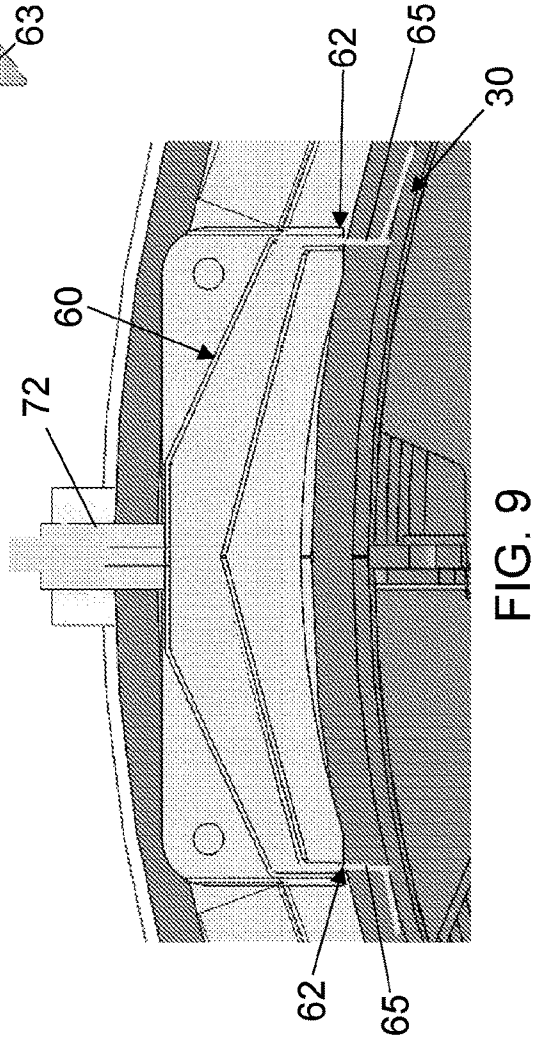
FIG. 9 shows the device of FIG. 7 applied on the tubular reactor of the apparatus according to the invention.

Conveniently, the means 6 for indirectly cooling the material passing through said chamber 4 comprise at least one dispensing device 60 configured to send on the external surface of at least one area of said tubular structure 3 a flow of cooling fluid—preferably water—which is shaped blade 65 (see FIG. 8).

By "blade" shaped flow we mean that the flow has a substantially laminar conformation, i.e. two dimensions (length and width) are much greater than the other dimension (thickness).

Conveniently, each dispensing device 60 is fixed with respect to the rotating tubular structure 3.

Preferably, each dispensing device 60 is arranged with respect to the tubular structure 3 so as to cascade a flow of blade-shaped refrigerant fluid on an area of the external surface of the tubular structure 3. Conveniently, for this purpose, each dispensing device 60 is mounted externally above the upper extremity zone of the tubular structure 3. Preferably, the dispensing devices 60 are arranged at a height or geodetic level higher than the tubular reactor 2 so that the blade of cooling fluid that comes out of each device 60 falls mainly by gravity onto the tubular structure 3 of the tubular reactor 2, then descending by gravity—and thus lapping—the lower lateral zones of the structure itself. Conveniently, in an embodiment not shown, the dispensing device 60 could be arranged laterally so that the blade water flow emerging from the device thus invests the lateral areas of the tubular structure 3.

Advantageously, the apparatus 1 according to the invention also comprises means 10 for feeding at least one cooling fluid (preferably water) to the dispensing devices 60.

Conveniently, the supply means 10 are fluidically connected at the inlet to the dispensing devices 60 to thus supply the latter with the refrigerant fluid.

Preferably, the supply means 10 can comprise at least one distribution circuit 61 of the cooling fluid arranged at least partially around a reactor 2 and configured to receive a cooling fluid (preferably mains water) from an external supply or from at least one collection tank 66 provided in said apparatus, while at the outlet it is connected with the dispensing devices 60. Conveniently, the distribution circuit 61 comprises a plurality of tubes, one for each dispensing device 60.

Advantageously, at least a part of the supply means 10 can receive the refrigerant fluid from the same water network that feeds a steel production plant and/or the like.

The cooling fluid advantageously comprises water, in particular already used or usable in the steel production plant.

Preferably, each dispensing device 60 is provided with at least one dispensing mouth 62 which is defined by a slot 63 with a substantially longitudinal development. Conveniently, the slot 63 can have a straight or even non-straight longitudinal profile, i.e. with curved or angled portions. Preferably, the dispensing mouth 62 defines a substantially elongated nozzle.

Conveniently, moreover, the dispensing device 60 is of the type which causes the cooling fluid to come out by rain, and not by spraying; suitably, the refrigerant fluid exiting from the dispensing device 60 laps the external surface of the tubular structure 30.

More in detail, unlike the known solutions, no nozzles are provided which spray the water or the refrigerant fluid with a flat jet, full cone or hollow cone, which are unable to spray evenly and with a layer of uniform thickness the external surface of the wall of the tubular structure, and there is also the risk of clogging of the nozzle, with consequent cooling problems.

Advantageously, the cooling means 6 are configured in such a way that from the dispensing devices 60 they come out with the best energy efficiency—since the water blade dispensing spout requires a lower kinetic load than any other type of nozzle—flows of refrigerant fluid configured with a blade of a certain thickness and length that is always constant over time, and this preferably also as a function of limited variations in the pressure and flow rate of the water or refrigerant fluid, thus also eliminating the risk of clogging of the dispensing outlets of said devices.

Conveniently, each dispensing device 60 comprises two laminar elements, respectively 64' and 64", preferably two pieces of sheet metal, facing each other (preferably overlapping) and spaced apart so as to define a passage chamber for the cooling fluid. Furthermore, the two laminar elements 64' and 64" are configured so as to define, preferably between their respective edges 67' and 67", said at least one slot 63 from which a blade-shaped flow of refrigerant fluid emerges.

Conveniently, a first laminar element (the outermost or upper one) 64' is provided with a connecting portion 72 for the fluidic connection with a pipe of the distribution circuit 61 of the refrigerant fluid. Conveniently, said first laminar element (the outermost or upper one) 64' comprises two planes inclined or curved downwards in mutually opposite directions.

Preferably, the other laminar element (the innermost or lower one) 64" comprises two inclined or curved planes downwards in opposite directions so as to be able to thus define two corresponding slots 63. Basically, the other laminar element (the innermost or lower one) 64" has a substantially sloping conformation.

Conveniently, the lateral edges of the laminar elements 64' and 64" can be folded substantially downwards so as to define between them slots 63 of various widths, from which blades of refrigerant fluid of corresponding thicknesses come out, thus regulating the flow of said fluid without creating turbulent motions that would compromise the cooling of the material with the same flow head.

Advantageously, each dispensing device 60 comprises at least two slots 63 for the outflow of a blade-shaped flow of refrigerant fluid and, suitably, said device is arranged with respect to the tubular structure 3 so that the flow outgoing from said at least two slits affects two respective areas, distinct from each other, of the external surface of the tubular structure 3. In particular, for this purpose, the two slots 63 of the dispensing device 60 are arranged externally and laterally, preferably symmetrically, with respect to the vertical plane passing through the axis X of the tubular structure 3. Preferably, the dispensing device 60 can be arranged so that its two slots 63, which are parallel to each other, are also parallel with respect to the longitudinal development and rotation axis X of the tubular structure 3.

Operationally, as said, the refrigerant fluid which comes out of the cooling devices 60 acts on the tubular structure 3 of the chamber 4 in such a way as to externally cool the wall of said structure, and consequently also indirectly cool the material to be cooled contained in said chamber 4.

In particular, each stream of blade-shaped refrigerant fluid that comes out of the dispensing devices 60 strikes/falls on a first area of the tubular structure 3 to then slide/flow—due to the effect of gravity and/or rotation of the tubular structure—and thus strike/lap a second area of said tubular structure which is adjacent to the first.

Advantageously, said at least one dispensing device 60 is mounted on the tubular reactor 2 so that the flow of blade-shaped coolant flowing out of each device falls from above onto an area of the tubular structure 3 of said reactor, preferably on the upper area of said structure.

Conveniently, in correspondence with the lower zone of the tubular structure 3 of the reactor 2 there is provided at least one tank 66 for collecting the cooling fluid which, after having escaped from said at least one dispensing device 60, has come into contact with the tubular structure 30. Conveniently, while the tubular structure 30 of the reactor 2 is rotating, said at least one collection tank 66 is fixed and, in particular, is mounted on the lower support base 18 of the fixed structure 17.

More in detail, the cooling fluid at temperature T1, coming from the water mains or relaunched by a pump from another collection tank, it comes out like a blade and from above on the external surface of the tubular structure 30, preferably licking both sides of the external surface of the wall defining the tubular structure, and descends by downward gravity where it detaches from the tubular structure 3 and falls into a corresponding collection tank 66 at a temperature T2, where T2 which is greater than T1.

Advantageously, the chamber 4 of the reactor 2 is configured to advance the material to be cooled (i.e. the white or black slag) in a first direction of movement. Conveniently, the cooling means 6 are configured to move the refrigerant fluid from a first section 7 to a second section 8 in a second direction at least partially opposite with respect to said first direction. In particular, the refrigerant fluid acts externally on the chamber 4 crossing it along its longitudinal development in a direction which is opposite to that with which the material to be cooled crosses/advances inside said chamber 4. In substance, suitably, the apparatus 1 is configured so that the heat exchange between the material to be cooled inside the chamber 4 and the cooling fluid occurs in countercurrent, i.e. in opposite directions of advancement along the longitudinal development of the reactor 2.

In accordance with the shape preferential embodiment illustrated in the attached figures, the reactor 2 preferably has a substantially cylindrical shape and extends along the main axis X between a first end, in which the inlet opening 5' is made, and a second end, in which it is made the outlet opening 5".

Preferably, the first direction of movement of the material to be cooled is substantially parallel to the main axis X and turned from the inlet opening 5' towards the outlet opening 5".

The tubular structure 3 can be made in a single tubular body or, as shown in the figures, by two or more tubular modules 30 connected in sequence to each other. In particular, in the latter case, the tubular modules 30 are provided with extremal flanges 31 for mutual fastening. Preferably, each dispensing device 60 is operatively associated with at least one tubular module 30.

Preferably, the union of the two flanges 31 of two adjacent tubular modules 30 also defines the contact/sliding base on which act the support wheels and the wheels of the motorization means 16 configured to cause the rotational movement of the tubular structure of the reactor 2.

Conveniently, several collection tanks 66' and 66" can be provided, each of which is positioned below at least one corresponding module 30' and 30" and intended to collect the refrigerant fluid that has licked the walls of the tubular structure of the corresponding module. Conveniently, the collection tanks 66' and 66" can be fluidically separated or they can be in fluid communication with each other.

Conveniently, the first underlying collection tank 66' to at least a first module 30' is fluidically connected to a pump 90 which is configured to re-launch the refrigerant fluid collected in said tank 66' towards the dispensing device 60 of at least a second module 30" which is adjacent (but in any case different) with respect to said first module 30'.

Conveniently, the second collection tank 66" underlying at least a second module 30" can be fluidically connected to a further pump 91 to return the refrigerant fluid used in the apparatus to the water network or to a cooling basin.

As shown in FIG. 11, the material to be cooled M at high temperature (Tin) enters the chamber 4 at the inlet opening 5' and exits the latter at a lower temperature Tout (<Tin) at the outlet opening 5", to then pass inside the screening segment 82. The refrigerant fluid coming from the supply means 10, and in particular from the water mains, enters the first section 7 (which can comprise one, two or more first modules 30') which is closest to the outlet 5" of the material from chamber 4; therefore, the refrigerant fluid that comes out of the dispensing devices 60 of the first section 7 comes into contact externally with the walls of the first modules 30', which in turn are in contact internally with the material present in the chamber 4, thus causing the cooling of the latter and the heating of the refrigerant fluid. Then, the cooling fluid—which heats up externally to the first modules 30'—falls into the first collection tank 66' and from there it is re-launched by the pump 90 towards the dispensing devices 60 of the second modules 30" of the second section 8 which is closest to the entrance opening. Therefore, the refrigerant fluid that comes out of the dispensing devices 60 of the second section 8 comes into contact externally with the tubular structure 3 of the modules 30" of this section, which in turn is in contact internally with the material present in the chamber 4, thus causing the cooling of the latter and the heating of the refrigerant fluid. Then, the refrigerant fluid—which heats up externally the tubular structure 3 of the second modules 30" of the second section 8—falls into the second collection tank 66" and from here is re-launched by a further pump 91 to return to the mains water supply or in a cooling basin.

Conveniently, it is understood that the apparatus 1 could comprise more than two sections 7 and 8 (and therefore more than two collection tanks 66' and 66") and/or each section 7 and 8 could also include a single module or more of two modules 30' and 30".

Advantageously, each module 30' or 30" is provided with its own dispensing device 60. Preferably, said dispensing device 60 is configured in such a way that said at least one blade of refrigerant fluid that emerges from said dispensing device has a development in length substantially corresponding to the length development of each module 30' or 30", to thus affect the tubular wall of each module along its entire longitudinal development.

Advantageously, the apparatus 1 also comprises a casing 69 which acts as a protection and which externally wraps, at least in part, the tubular structure 3 of the reactor 2. Conveniently, the protection casing 69 is fixed, i.e. it is not rotating, and preferably is mounted on the support frame 15. Conveniently, the casing 69 can be made in several pieces which develop from each dispensing device 60 around the lateral areas of the tubular structure 3 of the reactor 2.

In particular, the casing 69 is spaced apart from to the external surface of the tubular structure 30. Conveniently, the casing 69 acts as a protection to prevent the refrigerant fluid which comes into contact with the tubular structure 3 from splashing or escaping into the external environment surrounding the apparatus 1.

Advantageously, the casing 69 can be configured in such a way as to direct the cooling fluid which falls by gravity towards the underlying tank towards the tubular structure 3.

Conveniently, the dispensing devices 60—which are fixed (i.e. do not rotate with the tubular structure 30)—are mounted on the casing 69 and, preferably, are supported by the latter. Conveniently, the dispensing devices 60—which are fixed (i.e. they do not rotate with the tubular structure 30)—can be mounted and supported by another element of the support structure of the apparatus 1.

Advantageously, the reactor 2 is made of thermally conductive material, in particular it is made of metallic material, such as for example steel.

Conveniently, the apparatus 1 comprises at least one electronic control unit (not shown) for the control and management of the apparatus itself. Advantageously, the electronic control unit comprises at least one microcontroller, such as for example a PLC (programmable logic controller) or the like.

Conveniently, the apparatus 1 comprises at least a first temperature sensor operatively associated with the reactor 2, electronically connected to the electronic control unit and configured to detect at least one temperature measurement of the reactor 2 and/or of the material to be cooled.

Conveniently, the apparatus 1 comprises at least a second temperature sensor which is electronically connected to the electronic control unit and is configured to detect at least one temperature measurement of the refrigerant fluid entering at least one dispensing device 60 and/or correspondingly of the collection tank 66.

Conveniently, at least one sensor can be provided for detecting the presence of refrigerant fluid in or inside each dispensing device 60; this sensor can be electronically connected to the electronic control unit and is configured to send the corresponding detection to the electronic control unit.

Conveniently, a sensor can be provided for measuring the flow rate/flow and/or pressure of the refrigerant fluid entering the dispensing devices 60; this sensor can be electronically connected to the electronic control unit and is configured to send the measurement of the flow rate/flow to the electronic control unit.

Advantageously, a valve can be provided at the inlet and/or in correspondence of each dispensing device 60 which is electronically connected to the electronic control unit to command its opening and closing, and thus regulate the flow rate/flow and pressure of the refrigerant fluid escaping from the corresponding device.

Preferably, the electronic control unit is configured to receive the temperature measurement of said first and/or second temperature sensors and/or of said flow/flow and/or pressure sensor and/or of said presence detection sensor of refrigerant fluid and, suitably, it also comprises at least one processing module programmed to process the measurements and readings received, and thus generate a corresponding command signal for said valves so that a thickness of refrigerant fluid flows out of each dispensing device 60 which it is substantially constant along the entire length of the slot 63 of the dispensing mouth 62 of the device itself.

The electronic control unit is advantageously configured to receive the temperature measurement of said first and/or second temperature sensors and/or of said flow/flow and/or pressure sensor and/or of said sensor for detecting the presence of cooling fluid, and correspondingly controlling said valves, the motorization means 16 for varying the rotation speed of the reactor 2 and/or the inclination of the reactor.

Conveniently, said at least one electronic unit is electronically connected to the motorization means 16 and is programmed to control them to vary the speed of rotation of the reactor 2 and/or the inclination of the reactor with respect to the horizontal.

The electronic control unit is programmed to control the rotation of the reactor 2 according to a first direction of rotation, for example clockwise, or counterclockwise.

Otherwise, the electronic control unit can be programmed to rotate the reactor 2 in more than one direction of rotation, alternately, in order to mix the material inside the chamber 4 and increase the cooling efficiency of the apparatus 1 according to the invention.

Obviously, the electronic control unit can be connected to the sensors and to the motorization means in any manner known per se to those skilled in the art and therefore not described in detail below. For example, the electronic control unit may provide a wired connection or a wireless connection (wireless) without thereby departing from the protection scope of this patent.

Advantageously, in a possible embodiment (see FIG. 12), the apparatus 1 comprises a plurality of Peltier cells 99 which are mounted on the external surface of at least one zone of the tubular structure 3, preferably in correspondence with the section and/or module placed at or near the inlet opening 5' of the material to be cooled inside the chamber 4. Conveniently, therefore, the Peltier cells 99 are hit by the flow of refrigerant fluid that leaves the dispensing devices 60. Therefore, suitably, the Peltier cells 99 thus generate electrical energy by exploiting the temperature difference between the cooling fluid and the external surface of the tubular structure 30, which is internally in contact with the material to be cooled. Basically, this allows you to generate electricity starting from the thermal energy generated by the cooling of the material.

Advantageously, the electrical energy thus generated by the Peltier cells 99 can be reused inside the apparatus 1, preferably for example to power the sensors with which the apparatus itself is provided.

Conveniently, the Peltier cells 99 are distributed in a uniform and orderly manner on the external surface of at least one section of the tubular structure 3 or even along the entire tubular extension of the structure itself.

As is clear from what the cooling apparatus according to the invention is particularly advantageous, in that:

- it allows to overcome the drawbacks of the known solutions;
- is able to increase energy efficiency, while maintaining high quality standards of the material obtained and safety for operators and equipment;
- it allows to obtain a high energy efficiency;
- it is constructively completely reliable;
- it allows to cool the white or black slag in an optimal way, that is it obtains an optimal cooling of the white or black slag while obtaining the aforementioned high energy efficiency;
- it is easy to implement and with low costs.
- is able to treat white or black slag in the various and possible physical conditions in which it can occur, for example in the solid, semisolid-pasty or liquid state, according to requirements and needs;
- it is quick and easy to maintain and, at the same time, allows to improve energy efficiency in the recovery of white or black slag, while maintaining high quality standards of the material obtained;
- it is an alternative and an improvement with respect to the known solutions.

The present invention has been illustrated and described in some of its preferred embodiments, but it is understood that executive variations may be applied to them in practice, without however departing from the scope of protection of the present patent for industrial invention.

The invention thus conceived is susceptible of numerous modifications and variations, all of which are within the scope of the inventive concept; moreover, all the details can be replaced by other technically equivalent elements.

In practice, the materials used, as well as the dimensions, may be any according to the requirements and the state of the art.

The invention claimed is:

1. An apparatus (1), for cooling a material (M), comprising:

at least one reactor (2), substantially tubular, which is rotatable and which comprises a rotating tubular structure (3) defining a chamber (4) therein for receiving and passing through the material to be cooled, means (6) for indirectly cooling the material passing through said chamber (4) by means of a cooling fluid, said means (6) for indirect cooling comprise at least one dispensing device (60) for the cooling fluid, wherein said at least one dispensing device (60) comprises at least two dispensing mouths (62) defined by respective slots (63), with substantially longitudinal development, for the escape of the cooling fluid, said device being arranged with respect to the tubular structure (3) in so that the flow outgoing from said respective slots affects and laps two respective areas, distinct from each other, of an external surface of the tubular structure (3).

2. The apparatus according to claim 1, wherein said at least one dispensing device (60) is arranged with respect to the tubular structure (3) so as to cascade a flow of blade-shaped cooling fluid on said areas of the external surface of the tubular structure (3).

3. The apparatus according to claim 1, wherein said at least one dispensing device (60) is fixed and is positioned above said tubular structure (3) which is rotating.

4. The apparatus according to claim 1, wherein the apparatus is configured in such a way that the cooling fluid coming out of said at least one dispensing device (60) acts on the external surface of the tubular structure (3) along a longitudinal development thereof according to a direction which is opposite to that with which the material to be cooled passes through/advances in the chamber (4) defined inside the tubular structure (3).

5. The apparatus according to claim 1, further comprising at least one collection tank (66) which is positioned below said at least one dispensing device (60), to thereby collect the cooling fluid which has escaped from said at least one dispensing device and which has come into contact with the tubular structure (3).

6. The apparatus according to claim 1, wherein said tubular structure (3) comprises at least two tubular modules (30', 30") connected in sequence to each other and a dispensing device (60) for each module (30', 30").

7. The apparatus according to claim 6, wherein each tubular module (30', 30") is provided with its own dispensing device (60) which is configured in such a way that a blade of fluid coming out of slots (63) of each module have a development in length substantially corresponding to the development in length of each module (30', 30"), to thus affect the tubular wall of each module along an entire longitudinal development thereof.

8. The apparatus according to claim 1, further comprising a protective casing (69) which is fixed and which externally wraps, at least in part, the rotating tubular structure (3) of the reactor (2).

9. The apparatus according to claim 8, wherein said at least one dispensing device (60) is mounted on said casing (69) so that said casing (69) also acts as a support for said at least one dispensing device (60).

10. The apparatus according to claim 1, wherein said dispensing device (60) does not comprise nozzles configured to spray flat jet, full cone or hollow cone sprays of cooling fluid.

11. The apparatus according to claim 1, wherein each dispensing device (60) comprises two laminar elements (64', 64") facing each other and spaced apart so as to define between them a passage chamber for the cooling fluid.

12. The apparatus according to claim 11, wherein said two laminar elements (64', 64") are configured so as to define, between their respective edges (67', 67"), said at least two slots (63) from which respective blade-shaped flows of cooling fluid exit.

13. The apparatus according to claim 1, wherein the two slots (63) of the dispensing device (60) are arranged at the sides, symmetrically, with respect to a vertical plane passing through an axis (X) of longitudinal development of the tubular structure (3).

14. The apparatus according to claim 1, wherein the tubular structure (3) is made of at least two tubular modules (30) connected in sequence, each dispensing device (60) being operatively associated with at least one tubular module (30).

15. The apparatus according to claim 1, further comprising a plurality of Peltier cells (99) which are mounted on the external surface of at least one zone of the tubular structure (3) so as to be hit by the cooling fluid flow that comes out of said at least one dispensing device (60), said Peltier cells (99) thus generating electrical energy by exploiting the temperature difference between the cooling fluid and the external surface of the tubular structure (30), which is internally in contact with the material to be cooled.

* * * * *